United States Patent [19]

Pehr

[11] Patent Number: 4,748,720
[45] Date of Patent: Jun. 7, 1988

[54] HORNLESS STUFFING METHOD AND APPARATUS

[75] Inventor: George O. Pehr, Orland Park, Ill.

[73] Assignee: Viskase Corporation, Chicago, Ill.

[21] Appl. No.: 52,082

[22] Filed: May 19, 1987

[51] Int. Cl.$^4$ ............................................. A22C 11/02
[52] U.S. Cl. ............................................. 17/49; 17/35
[58] Field of Search ...................... 17/49, 41, 42, 35

[56] References Cited

U.S. PATENT DOCUMENTS 3,115,668  5/1962  Townsend.
4,476,609  10/1984  Loudin.
4,558,486  12/1985  Nakamura.
4,583,264  4/1986  Nausedas.

Primary Examiner—Willie G. Abercrombie
Attorney, Agent, or Firm—Roger Aceto

[57] ABSTRACT

A hornless stuffing apparatus and method wherein stuffing of casing from a shirred stick is accomplished by utilizing the shirred stick per se as a conduit for foodstuff.

23 Claims, 2 Drawing Sheets

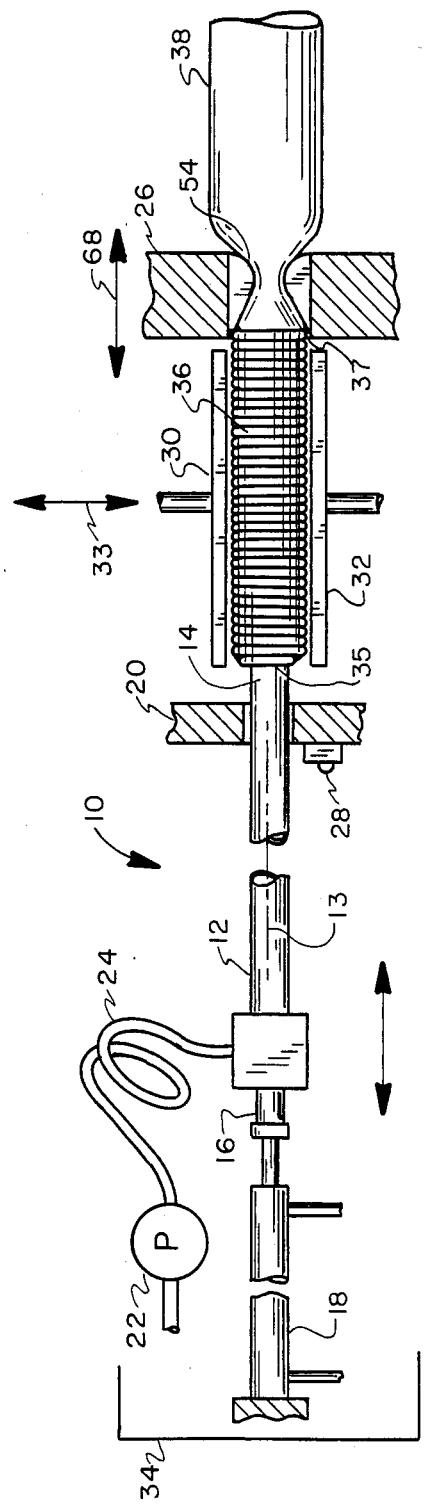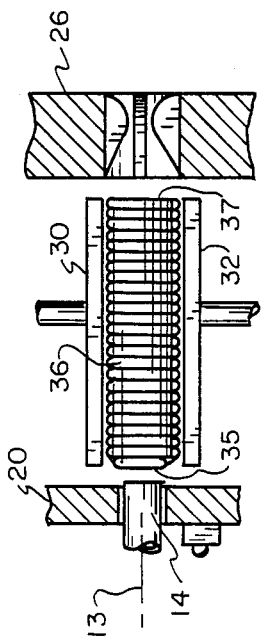
FIG. 1
FIG. 2

HORNLESS STUFFING METHOD AND APPARATUS

TECHNICAL FIELD

The present invention relates to a stuffing apparatus and method which utilizes a shirred casing stick as a foodstuff conduit.

BACKGROUND OF THE INVENTION

Typically, stuffing of casing is accomplished by gathering a length of the casing on to a stuffing horn. The foodstuff is then pressed through the horn and into the casing which is stuffed and drawn forward off the horn.

Casings most commonly used are made of regenerated cellulose and generally are of two types. Small size unreinforced cellulosic casing is used for the production of frankfurters and the like. Large size fibrous reinforced cellulosic casing is used for the production of larger diameter products, such as bologna and hams.

It is customary in the art to utilize casing in the form of hollow shirred sticks. A shirred stick is composed of a relatively long length of casing shirred and longitudinally compacted to a relatively short length. For example, a shirred stick 50 centimeters long may contain upwards to 50 meters of casing. Shirred sticks are preferred in automatic stuffing operations because the stuffing cycle, once started, can continue uninterrupted until the entire length of casing is stuffed. In conventional use, the shirred stick is slipped over the stuffing horn so that the horn extends through the entire length of shirred stick. This requires that the bore of the stick be relatively straight and have a diameter large enough to accomodate the passage of the horn through the stick.

It is well known in the art that the ratio of the length of casing contained by the stick to the length of the stick (hereafter referred to as pack ratio) depends in part on the bore size of the stick. In particular, pack ratio varies inversely to the bore diameter of the stick.

Packing houses usually prefer to use a stuffing horn having as large a bore diameter as possible. This maximizes the flow rates through the horn and increases productivity. As large a bore diameter as possible also is better for foodstuff that tend to form aesthetically undesirable grease and fat deposits at the casing/foodstuff interface.

The shirred stick must have a bore diameter larger than the stuffing horn diameter in order to provide the clearance needed for placing the stick on the stuffing horn. Thus, the desirable stick feature of high pack ratio is compromised by the desirability of having a stuffing horn as large in diameter as possible for any given size of casing. Accordingly, the length of casing contained in a stick supplied to the packing house is dictated in part by the length and the diameter of the stuffing horn used by the packing house.

Ways are continuously being sought to satisfy the conflicting objectives of increasing the stick pack ratio while maintaining a bore diameter able to accomodate the largest possible stuffing horn. For example, manufacturers of casing articles have improved shirring and compaction methods so as to increase the length of casing contained in the stick while maintaining the largest bore diameter possible. Manufacturers of stuffing apparatus tend to make the stuffing horn wall as thin as possible to maximize the inside diameter of the horn. As a result, horns of conventional stainless steel, now used for stuffing small diameter casings, have such thin walls that they are easily damaged. Meat packers cope with this problem by maintaining an inventory of stuffing horns in a variety of sizes and by changing horns so that the largest possible horn in used with any given casing stick.

Another solution to this problem is disclosed in U.S. Pat. Nos. 4,467,499; 4,540,300 and 4,627,130. These patents each disclose a casing article comprising a length of shirred and highly compacted casing positioned on a disposable stuffing horn. The highly compacted casing grips tightly about the disposable stuffing horn so that the friction between the casing and the horn holds the casing at an enhanced pack ratio. The pack ratio of these articles is further enhanced by elimination of the clearance space otherwise needed to permit the user to slip the shirred casing onto the stuffing horn.

Accordingly, it is an object of the present invention to provide a stuffing method and apparatus which opens the full bore diameter of a shirred stick to product flow and eliminates the need to occlude of otherwise restrict the diameter of the stick bore by positioning a stuffing horn within the stick bore.

Another object of the present invention is to provide a stuffing method and apparatus which eliminates the need for the meat packer to maintain stuffing horns of different sizes in inventory.

A further object of the present invention is to provide a stuffing method and apparatus which permits the casing manufacturer to provide more casing in a shirred stick without decreasing the size of the bore diameter required for efficient stuffing.

SUMMARY OF THE INVENTION

In one aspect, the present invention comprises a method for stuffing a hollow shirred casing stick composed of a shirred length of casing the pleats of which define an axial bore through the stick open at an aft end of the stick, said method comprising the steps of:

(a) communicating the open aft end of the stick to a foodstuff delivery outlet;

(b) introducing foodstuff under pressure from the delivery outlet and into the bore at the open aft end of the stick bore; and (c) conducting the foodstuff through the stick bore in direct contact with the pleats defining the bore for deshirring, filling and moving forward casing from casing pleats at a fore end of the stick.

In another aspect, the present invention is characterized by apparatus for stuffing a hollow shirred casing stick composed of a length of shirred and longitudinally compacted cellulosic casing the pleats of which define a cylindrical bore open at an aft end of the stick, said apparatus comprising:

(a) foodstuff delivery means engagable against the aft end of a said stick, said delivery means having an outlet for foodstuff adapted to communicate with the open end of the stick bore;

(b) means for urging said delivery means and stick axially together for pressing the aft end of the stick against the delivery means and establishing a substantially fluid tight communication between the open end of stick bore and the outlet; and (c) means for introducing foodstuff under pressure from the outlet directly into and through the stick bore, and the stick bore constituting a conduit for conveying foodstuff through the stick and into casing which deshirrs from the fore end of the stick, fills and moves forward.

In the present invention the problem of increasing pack ratio while maintaining as large a bore diameter as possible for stuffing is solved by a stuffing method and apparatus which eliminates the need for a stuffing horn.

In the method and apparatus of the present invention, an outlet for the foodstuff is pressed against one end of a shirred stick so the product is introduced directly into and through the bore of the shirred stick. Thus, the stick bore itself functions as a conduit for conveying the foodstuff through the stick and into casing deshirring from the opposite end of the stick. Since there is not stuffing horn to occlude or restrict the bore of the shirred stick, the full bore diameter of the stick is utilized as a flow conduit for the foodstuff being stuffed. Eliminating the stuffing horn allows the meat packer to increase flow rates during stuffing because the effective diameter of the flow conduit is now the full bore diameter of the shirred stick. It also eliminates the need for the meat packer to have on hand stuffing horns of different sizes. It further permits the casing manufacturer to downsize the bore of the stick and thereby increase the length of casing in the stick without compromising the conduit diameter required for efficient stuffing.

DESCRIPTION OF THE DRAWINGS

FIG. 1 is a schematic representation showing components of a hornless stuffing machine in an operative position utilizing a shirred stick as a conduit for foodstuff;

FIG. 2 is a view similar to FIG. 1 only showing components of the stuffing machine with a shirred stick in a load position;

DETAILED DESCRIPTION OF THE INVENTION

Figure 3:
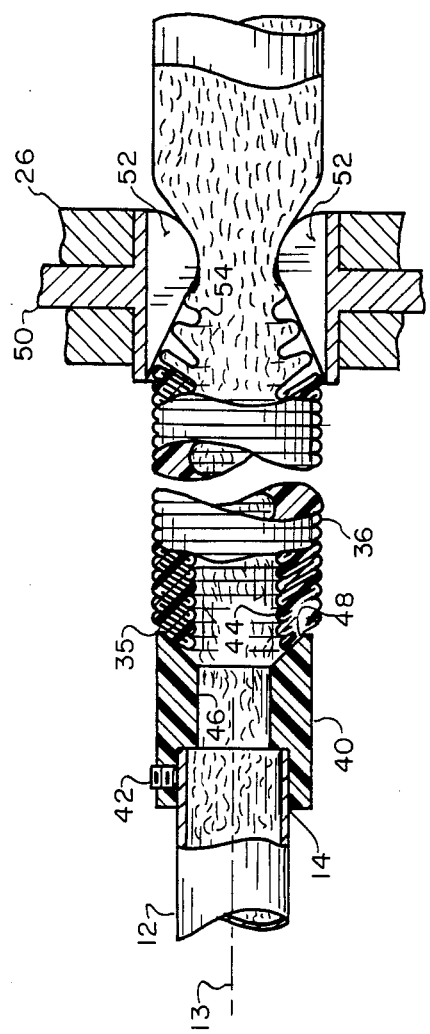
FIG. 3 is a view showing portions of the FIG. 1 apparatus on an enlarged scale including means for communicating the shirred stick to the foodstuff discharge outlet of the stuffing machine.

Referring to the drawings, FIG. 1 shows the apparatus of the present invention generally indicated at 10. The apparatus includes a pusher tube 12 mounted for rectilinear motion in the direction of its longitudinal axis 13. The tube has a foodstuff delivery outlet end 14 and an inlet end 16. For purposes of reference, movement of the tube along its longitudinal axis in the direction of its outlet end 14 will be considered an advance or a forward motion whereas movement of the tube along its longitudinal axis in the direction of its inlet end 16 will be considered a rearward movement.

Means for moving pusher tube 12 along its longitudinal axis is represented by a pneumatic cyclinder 18. It should be appreciated that other means such as a rack and pinion or other linear drive may be used to move the pusher tube. The pusher tube is guided by a sleeve 20 disposed towards the discharge end of the tube.

Connected to the inlet end 16 of the pusher tube 12 is a flexible or longitudinally expandable pipe 24.

A pump 22 is provided for forcing foodstuff under pressure from a source (not shown) through pipe 24 and into the inlet end 16 of tube 12.

Completing the structure of the stuffing apparatus 10 is a limit switch 28 and an annular stop 26 which is disposed forward of, and axially aligned with, pusher tube 12. A pair of locating and support members 30,32 are optional features. When used, support members 30,32 preferably are disposed between sleeve 20 and annular stop 26 and are arranged for movement transverse to the stuffing axis 13 for purposes set out hereinbelow.

It should be appreciated that the components thus far described are carried on a frame of the stuffing machine, a portion of which is shown at 34.

FIG. 1 further shows a shirred casing stick 36 in a stuffing position. Shirred stick 36 is conventional in that it comprises a relatively long length of non-reinforced or fibrous reinforced cellulose casing which is shirred and longitudinally compacted by conventional means to a relatively short length.

Generally, sticks composed of small size unreinforced cellulose, such as used in the manufacture of frankfurters and the like, are relatively self-sustaining and coherent in that the stick can be manually or mechanically handled without breakage. Sticks of fibrous reinforced cellulosic casing are less coherent and usually require a support to hold its pleats together for handling. For example, it is customary to place a plastic shrink wrap about the stick or to utilize other means to prevent the stick from losing its integrity.

In the stuffing position of FIG. 1, shirred stick 36 is captured between stop 26 and the discharge end 14 of pusher tube 12 by pressing the pusher tube 12 against an aft 3nd 35 of the stick. This holds the stick against annular stop 26 and, in the case of the less coherent sticks of fibrous casing, it maintains a compressive force on the stick to maintain the structural integrity of the stick during stuffing. With this arrangement the operation of pump 22 forces foodstuff under pressure through flexible pipe 24 and into the aft end 16 of pusher tube 12. The foodstuff then flows through the pusher tube directly into and through the bore of casing stick 36 causing the vcasing to deshirr, fill and move forward from a fore end 37 of the stick and through annular stop 26 for producing a stuffed product indicated at 38. Thus, annular stop 26 functions as a means to restrain forward movement of stick 36 while allowing casing to deshirr from the stick, fill and move forward through the stop.

Operation of the apparatus will be described as beginning with pusher tube 12 moved to an extreme rearward position or to the left as viewed in the Figures. This permits locating a casing stick 36 at a load position between stop 26 and the forward end 14 of the pusher tube as shown in FIG. 2. The stick in its load position is in axial alignment with the longitudinal axis 13 of pusher tube 12. The optional support members 30,32 can be used to locate and support a shirred stick 36 at the load position as discussed more fully hereinbelow.

After the stick in put into this load position, pneumatic cylinder 18 (FIG. 1) is operated to advance pusher tube 12 against the aft end 35 of the stick and to push the stick longitudinally forward until the fore end 37 of the stick butts against annular stop 26. This captures the stick between the annular stop and the pusher tube and effects a fluid tight communication between the pusher tube and the bore of the shirred stick. Pump 22 is then operated to force the foodstuff through flexible pipe 24 and into the inlet end 16 of the pusher tube 12.

As set out hereinabove, foodstuff will flow through pusher tube 12 directly into the bore of shirred stick 36 and pass through the stick bore in direct contact with the pleats of the shirred stick that define the stick bore. As the foodstuff exits under pressure at the fore end of the stick, casing 54 from the fore end deshirrs, fills and moves forward through annular stop 26 to form the stuffed product 38.

As pleats deshirr from the fore end of the stick, the stick shortens. However, the pressure exerted by pneumatic cylinder 18 containes to urge the pusher tube 12 in a forward direction. This keeps the fore end of stick 36 pressed against the annular stop 26 and maintains the communication between the pusher tube and the aft end of the stick. Stuffing continues in this fashion until the stick is substantially deshirred and expended.

Limit switch 28 will terminate the stuffing operation just prior to the time the last few pleats of the stick pass through annular stop 26. For example, the limit switch can be fixed to sleeve 20 and arranged to operate when pusher tube 12 has reached the limit of its forward travel. After stuffing is terminated, cylinder 18 is reversed to move pusher tube 12 to the extreme rearward position so that a fresh stick 36 can be put into the load position.

It should be appreciated that pusher tube 12 is not extended through the bore of stick 36 but remains pressed against the aft end 35 of the stick. Thus, the stick itself defines a conduit for the foodstuff and the length of this conduit decreases during the stuffing operation and is eventually expended.

Since pusher tube 12 presses against the aft end of stick 36 and does not extend through the bore of the shirred stick, it also should be appreciated that the full diameter of the stick bore is used to conduct foodstuff through the stick. This provides certain advantages. In particular, the stick bore is not occulded by the wall thickness of a stuffing horn so that the full diameter of the stick bore is utilized to accomodate flow. Another advantage is that because there is no stuffing horn, the bore size of the stick can be decreased thereby increasing the pack ratio. Accordingly, a stick having the same inside diameter as the inside diameter of a conventional stuffing horn will contain a greater length of casing than a conventional stick made with a larger bore to accomodate a stuffing horn within the stick bore.

As setout hereinabove, support members 30,32 shown in FIG. 1 are optional features. They extend parallel to the longitudinal axis 13 of shirred stick 36 and are arranged for transverse movement toward and away from this axis as indicated by arrow 33. When used, support members 30,32 operate to capture and hold s tick in the load position while pusher tube 12 moves longitudinally against the stick. The support members then retract slightly to provide a clearance space so as not to impede the free movement of the stick in a forward direction during the stuffing operation. The support members also are useful in stuffing operations which require that the stick be rotated about its longitudinal axis during stuffing. For example, if the stick is spun during stuffing, support members 30,32 may be arranged to float against the casing in order to prevent the stick from whipping as it rotates.

In some stuffing machines such as disclosed in U.S. Pat. No. 3,155,668 rotation of the stick is used to facilitate linking of the stuffed product. Linking mechanisms per se are well known in the art and are not described in detail herein. Such a linking mechanism is shown, for example, in the aforesaid U.S. Pat. No. 3,115,668. In the present invention, spinning the stick is accomplished by rotating stop 26 in a manner well known in the art as disclosed in the aforesaid U.S. Pat. No. 3,115,668.

FIG. 3 illustrates in greater detail the means for comunicating the pusher tube 12 to the aft end of the stick and for rotating the stick. As shown in FIG. 3, pusher tube 12 has a relatively large inside diameter so it can be used to stuff casing of various sizes.

Attached to the discharge end 14 of pusher tube 12 is an adapter 40. The adapter is attached by any suitable means such as a set screw 42. The purpose of the adapter is to provide a fluid tight connection to the shirred stick 36 and to conduct foodstuff directly into the bore 44 of the shirred stick. As discussed hereinabove, the shirred stick 36 is conventional and is composed of a length of a shirred and longitudinally compacted casing. The stick is hollow and the pleats formed by shirring define the substantially straight cylindrical bore 44 through the stick.

Adapter 40 has an inside diameter 46 at its outlet which is equal to, and preferably not greater than, the diameter of bore 44 to permit funneling the foodstuff from pusher tube 12 directly into stick bore 44. The outlet end face 48 of the adapter has a profile to match the profile of the aft end 35 of stick 36. This will permit the adapter to mate with the aft end of the stick and effect a substantially fluid tight communication with the open end of the stick bore as the adapter and the stick are pressed together.

While adapter 40 can be made of any suitable material, it is preferred that it be made of a low friction material such as tetrafluoroethylene. An adaptor 40 of a low friction material is particularly useful if stuffing requires spinning the stick about its longitudinal axis. As described above, spinning can be accomplished by a conventional chuck used in manufacture of frankfurter type sausages as disclosed in U.S. Pat. No. 3,115,668. In this embodiment annular stop 26 may include a rotatably driven member 50 having a purality of internal flutes 52 which press against the deshirred casing 54 being stuffed in order to grip and rotate the casing.

When using a chuck as disclosed in U.S. Pat. No. 3,115,668 having a rotatably driven member 50 and flutes 52, it has been found that the stuffed product has a blemish at the casing/foodstuff interface. This blemish spirals about the stuffed product. The appearance of the stuffed product is improved by using a chuck which has a smaller inside diameter (as defined by flutes 52) than is conventionally used for stuffing the same size casing. The inside diameter giving the best appearance will vary and depends upon the foodstuff, casing size and other stuffing parameters and can be easily determined by one of ordinary skill in the art.

Figure 4:
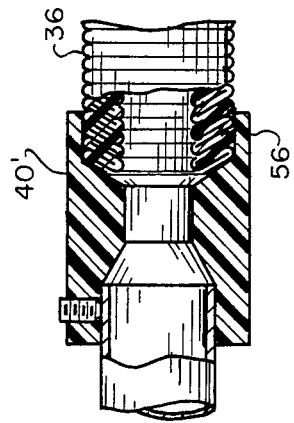

FIG. 4 represents an adapter configuration different from the configuration shown in FIG. 3. In this embodiment the adapter 40' has an external collar 56 at its outlet end which embraces the outside diameter of the aft end portion of stick 36. The additional surface area of contact provided by collar 56 will facilitate effecting a fluid tight engagement between adapter 40' and stick 36.

Figure 5:
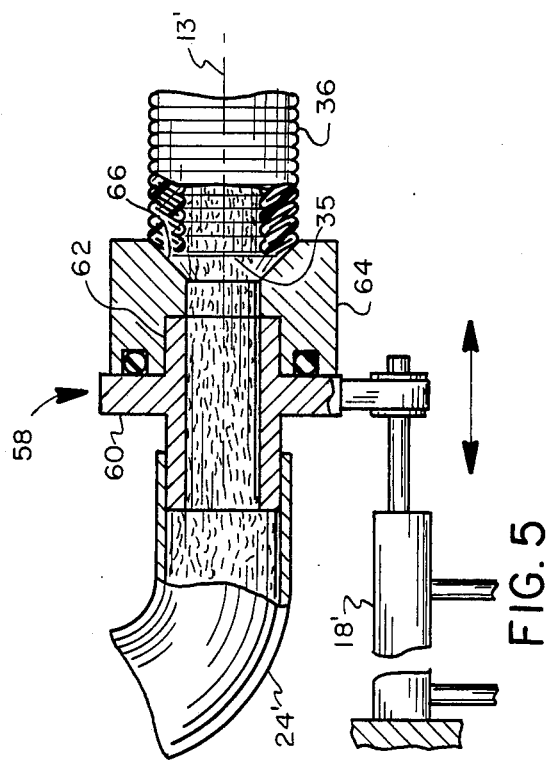
FIGS. 4 and 5 are views showing other embodiments of the means for communicating the stick to the discharge outlet of the stuffing machine.

FIG. 5 represents still another apparatus embodiment of the invention. In the embodiment of FIG. 5, the elongated pusher tube 12 of FIG. 1 is eliminated and its function is assumed by a far shorter stub tube generally indicated at 58. Stub tube 58 has a body portion 60 connected directly to an end of flexible pipe 24', the other end of the pipe being connected to a foodstuff pump (not shown). A pneumatic cylinder or other appropriate linear motor 18' connected to the body 60 of stub tube 58 moves it longitudinally along a stuffing axis indicated at 13'.

Stub tube 58 has an internal collar 62. Seated on collar 62 is a nose piece 64. The forward or leading end face 66 of nose piece 64 is adapted to mate with the open aft end 35 of the casing stick 36. As shown, the nose piece 64 is removable from collar 62 so it can be replaced as necessary to accomodate a different diameter of casing stick 36. Also, nose piece 64 can be rotatably mounted on collar 62 to facilitate rotation of the stick.

Thus, stub tube 58 comprises means to communicate the flexible pipe 24' directly to the open end of the shirred stick. The stub tube 58 and its nose piece 62 constitute the foodstuff delivery outlet of the stuffing machine, and pneumatic cylinder 18' constitutes the means for pressing the delivery outlet and the casing stick 36 together.

It should be appreciated that various modifications can be made to the method and apparatus as described without departing from the spirit and scope of the invention as claimed. For example, pusher tube 12 (and stub tube 58) has been described as being longitudinally movable toward stop 26 for pressing against the ends of a casing from a fixed pusher tube (FIG. 1), or by moving both the pusher tube and stop.

It also should be appreciated that other casing material such as collagen or shirred films can be used instead of the casing of regenerated cellulose as described.

Having thus described the invention in detail, what is claimed as new is:

1. A method of stuffing a hollow shirred casing stick composed of a shirred length of casing the pleats of which define an axial bore through the stick which is open at an aft end of the stick, said method comprising the steps of:
   (a) communicating the open aft end of the stick to a foodstuff delivery outlet;
   (b) introducing foodstuff under pressure from the delivery outlet and into the bore at the open aft end of the stick; and
   (c) conducting the foodstuff through the stick bore in direct contact with the pleats defining the bore for deshirring, filling and moving forward casing from casing pleats at a fore end of the stick.

2. A method as in claim 1 including maintaining an axial compressive loading on said stick while introducing foodstuff into the bore at the open aft end of the stick.

3. A method as in claim 1 wherein said communicating step is accomplished by pressing axially together the foodstuff delivery outlet and the stick to maintain the outlet in substantially fluid tight communication with the open aft end.

4. A method as in claim 1 including:
   (a) positioning an annular stop longitudinally spaced from and axially aligned with the delivery outlet;
   (b) locating the shirred stick in a load position between the delivery outlet and the annular stop wherein the longitudinal axis of the stick is axially aligned with the delivery outlet and annular stop; and thereafter
   (c) pressing the delivery outlet against the open aft end of the stick.

5. A method as in claim 4 including reducing the longitudinal distance between the delivery outlet and stop for capturing the stick therebetween.

6. A method as in claim 5 wherein capturing the stick between the delivery outlet and annular stop is accomplished by moving the delivery outlet towards the stop.

7. A method as in claim 4 including filling and moving forward casing from pleats at the fore end of the stick through the annular stop.

8. A method as in claim 4 including continuing said pressing step by urging said discharge outlet and annular stop together during the course of said deshirring and filling of the casing contained by the stick.

9. A method as in claim 1 including rotating the stick about its longitudinal axis during the course of said deshirring, filling and moving forward of casing.

10. A method as in claim 1 wherein said stick bore constitutes a conduit for foodstuff and said deshirring, filling and moving forward of casing pleats from the fore end of said stick continues until said casing stick and the conduit constituted by its bore are expended.

11. A method for stuffing a hollow shirred stick composed of a shirred and longitudinally compacted length of cellulosic casing the pleats of which define a cylindrical bore that is open at an aft end of the stick. said method comprising the steps of:
   (a) communicating the open aft end of the stick to a foodstuff delivery outlet;
   (b) pressing together the stick and the foodstuff delivery outlet to establish a substantially fluid tight communication between the open end of the stick bore and the delivery outlet;
   (c) introducing foodstuff under pressure from the outlet directly into and through the stick bore such that the stick bore constitutes a conduit for the foodstuff;
   (d) passing the foodstuff through the stick bore and into casing by deshirring, filling and moving forward casing from pleats at the fore end of the stick; and
   (e) continuing said deshirring, filling and moving forward of casing until substantially all the pleats of the stick have deshirred, thereby expending both the stick and the conduit for the foodstuff constituted by the stick bore.

12. Apparatus used for stuffing a hollow shirred casing stick composed of a length of casing the pleats of which define a cylindrical bore open at an aft end of the stick, said apparatus comprising:
   (a) foodstuff delivery means engagable against the aft end of a said stick, said delivery means having an outlet for foodstuff adapted to communicate with the open end of the stick bore;
   (b) means for urging said delivery means and stick axially together for pressing the aft end of the stick against the delivery means and establishing a substantially fluid tight communication between the open end of stick bore and the delivery outlet; and
   (c) means for introducing foodstuff under pressure from the outlet directly into and through the stick bore and the stick bore constituting a conduit for conveying foodstuff through the stick and into casing which deshirrs from the fore end of the stick fills and moves forward.

13. Apparatus as in claim 12 wherein said foodstuff delivery means is a member having an end face adapted to mate with and press against the aft end of a said casing stick and said outlet for foodstuff opens through said end face.

14. Apparatus as in claim 13 wherein said outlet has an inside diameter substantially equal to the bore diameter of a said stick.

15. Apparatus as in claim 13 wherein said foodstuff delivery means comprises:
    (a) an elongated tube having an inlet end communicating with a source of foodstuff under pressure and an outlet end; and
    (b) said member being disposed at said tube outlet end.

16. Apparatus as in claim 15 wherein said member is releasably attached to said tube outlet end.

17. Apparatus as in claim 15 wherein said member comprises:
    (a) a body portion attached to said tube outlet end; and
    (b) a nose piece portion including said end face and said outlet for foodstuff.

18. Apparatus as in claim 17 wherein said nose piece is journaled to said body portion for rotation about the longitudinal axis of a said stick pressed against said face.

19. Apparatus as in claim 15 wherein said delivery means is movable longitudinally to mate and press said end face against the aft end of a said stick and at least part of said elongated tube is a flexible pipe to accomodate the longitudinal movement of said delivery means.

20. Apparatus as in claim 12 including restraining means longitudinally spaced from and axially aligned with said delivery means so as to define a stick loading position therebetween, said restraining means being pressable against the fore end of a said stick located at said load position.

21. Apparatus as in claim 20 wherein said restraining means is annular with an opening therethrough to accomodate passage of filled casing.

22. Apparatus as in claim 19 wherein said restraining means is rotatable and includes gripping means for gripping and rotating filled casing passing through said opening.

23. Apparatus as in claim 12 wherein said urging means comprises a linear motor operatively connected to said delivery means for moving said delivery means against the stick open end.

* * * * *

UNITED STATES PATENT AND TRADEMARK OFFICE
CERTIFICATE OF CORRECTION

PATENT NO. : 4,748,720
DATED      : June 7, 1988
INVENTOR(S) : George O. Pehr

It is certified that error appears in the above-identified patent and that said Letters Patent is hereby corrected as shown below:

In col. 2, line  4, change "in" to -- is --.

In col. 2, line 21, change "of" to -- or --.

In col. 3, line 13, change "not" to -- no --.

In col. 4, line 30, change "3nd" to -- end --.

In col. 4, line 39, change "vcasing" to -- casing --.

In col. 4, line 55, change "in" to -- is --.

In col. 5, line  8, change "containes" to -- continues --.

In col. 5, line 34, change "occulded" to -- occluded --.

In col. 5, line 50, change "s tick" to -- a stick --.

Signed and Sealed this

Twenty-seventh Day of February, 1990

Attest:

JEFFREY M. SAMUELS

Attesting Officer     Acting Commissioner of Patents and Trademarks